3,635,904
PROCESS FOR MANUFACTURE OF RIGID
NONCELLULAR POLYURETHANE
Peter James Briggs and William Raymond Clegg, Manchester, England, assignors to Imperial Chemical Industries Limited, Millbank, London, England
No Drawing. Filed Jan. 8, 1970, Ser. No. 1,539
Claims priority, application Great Britain, Jan. 9, 1969, 1,323/69
Int. Cl. C08g 22/04
U.S. Cl. 260—77.5 AA                           3 Claims

ABSTRACT OF THE DISCLOSURE

A process for manufacture of shaped polyurethane articles which comprises forming an anhydrous reaction mixture of one or more organic polyisocyanates and one or more organic polyols such as will provide a rigid polyurethane on curing, allowing the mixture to cure to a gelled state and subjecting the mixture to a fabrication step prior to the mixture reaching a fully cured state.

---

This invention relates to a new polymerisation process and more particularly to a process for the manufacture of homogeneous polyurethane articles of a rigid kind.

The manufacture of homogeneous elastomeric or leather-like products by interaction of polyisocyanates with polyhydroxy compounds under anhydrous conditions is well-known. The present invention is concerned with polyurethanes of a harder, and more rigid type than those useful as elastomers or leather substitutes. These new polyurethanes are distinguished by a higher heat distortion temperature and higher tensile modulus at ambient temperature than the elastomeric or leatherlike polyurethanes previously used and hence are of value in the manufacture of shaped, rigid articles.

This increase in rigidity is obtained by choosing reactants of a higher functionality than those used for the manufacture of elastomeric or leather substitutes so that there is a higher proportion of heat-stable cross-links in the polymer. As a result, these polyurethanes fall more into the category of thermosetting rather than thermoplastic resins, i.e. once cured, they decompose if attempts are made to shape them at elevated temperatures, whereas elastomer polyurethanes can usually be subjected to a certain amount of working at elevated temperatures without undue loss of properties. In consequence, it has hitherto been believed that shaped articles involving rigid polyurethanes require a liquid reaction mixture to be introduced into a mould and allowed to cure, further shaping only being possible by machining operations.

The present invention is based on the observation that useful polyurethane articles can be obtained by forming an anhydrous reaction mixture of one or more organic polyisocyanates and one or more organic polyols such as will provide a rigid polyurethane on curing, allowing the mixture to cure to a gelled state and subjecting the mixture to a fabrication step prior to the mixture reaching a fully cured state. Suitable reaction mixtures contain organic polyisocyanates and polyols of such kinds and proportions as contain from 2 to 5 branching points per 1000 units of molecular weight and a NCO/OH ratio of from 0.95/1 to 1.2/1.

The term "anhydrous" as used herein is intended to refer to conditions in which there is at most 0.1% by weight of water in the reactants.

As examples of organic isocyanates which may be used there may be mentioned aliphatic diisocyanates such as hexamethylene diisocyanate, aromatic diisocyanates such as tolylene-2:4-diisocyanate, tolylene-2:6-diisocyanate, diphenylmethane - 4:4' - diisocyanate, 3 - methyldiphenylmethane-4:4'-diisocyanate, m- and p-phenylenediisocyanate, chlorophenylene-2:4-diisocyanate, naphthylene-1:5-diisocyanate, naphthylene-1:4-diisocyanate, diphenyl-4:4'-diisocyanate, 4:4'-diisocyanate-3:3'-dimethyldiphenyl, diphenylether diisocyanates, and cycloaliphatic diisocyanates such as dicyclohexylmethane diisocyanate, and methylcyclohexyldiisocyanate, and mixtures of these diisocyanates.

Other organic isocyanates which may be used include uretedione polymers of the organic diisocyanates mentioned above, e.g. as obtained by heating the diisocyanate in the presence of an alkali metal hydroxide, a tertiary amine or a heavy metal alkanoate; also low molecular weight interaction products of the above diisocyanates with water (i.e. primarily triisocyanato biurets) or with aliphatic polyols, e.g. glycerol, trimethylolpropane and hexan-1,2,6-triol, possibly admixed with a glycol, e.g. ethylene, butylene or hexylene glycol (forming mainly isocyanato-ended trisurethanes or a mixture of isocyanate-ended bis- and tris-urethanes. The preferred polyisocyanates are the mixtures of di- and higher polyisocyanates resulting from phosgenation of the condensation for formaldehyde, in the presence of acid, with aniline or its homologues or nuclear substituted products, e.g. toluidine, anisidine and chloroanilino.

As examples of polyols for use in the new process, there come primarily into consideration hydroxyl-terminated polyesters, polyesteramides, polyacetals and polyethers of molecular weight 200 to 1000, preferably triols or polyols of higher functionality having molecular weights within this range and above all within the range of 250 to 500.

Suitable esters are the mixed esterification products of aliphatic dicarboxylic acids, e.g. adipic acid and mixed aliphatic diols and triols, e.g. glycerol, trimethylolpropane, ethylene, propylene, hexylene and diethylene glycols having OH values in the range of 100 to 650 and acid values of 3.0 or below.

e.g.                                              OH value

Propylene glycol (6 p.b.w.)/glycerol (1 p.b.w.)/
  adipic acid (4 p.b.w.) _____ 340
Diethylene glycol (5 p.b.w.)/trimethylolpropane (1
  p.b.w.)/adipic acid (4 p.b.w.) _____ 362
Propylene glycol (3.5 p.b.w.)/glycerol (1 p.b.w.)/
  adipic acid (5 p.b.w.) _____ 186

However, for the polyol component of the mixture, there is preferably used a polypropylene ether polyol or a mixture of polypropylene ether polyols which has 2 to 5 branch points per 1000 units of molecular weight. Such a polyol can be obtained, for example, by reacting propylene oxide with a trihydric alcohol such as glycerol, trimethylolethane, trimethylolpropane, or 1,2,6-hexanetriol, or with a tetra- or higher polyhydric alcohol such as pentaerythritol or sorbitol or by reacting propylene oxide with amine containing compounds such as ammonia, hydrazine and ethanolamine, diaminodiphenylmethane and toluene diamines. Mixtures of such reaction products with each other, with similar branched propylene ether polyols of higher molecular weight, with propylene ether diols, linear polyesters or with diamines can also be used, provided that the mixture maintains the requirement of 2 to 5 branch points per 1000 units of molecular weight. Other polyol components which can be used as polypropylene ether polyols of the kinds which have just been described which have been treated with ethylene oxide to introduce a small proportion of hydroxyethyl groups at the end of the polypropylene ether chains. In such mixtures the hydroxyethyl groups should constitute at most 50% by weight of the alkeneoxy radicals.

The number of branch points per 1000 of molecular weight for a polyol can be calculated in the following manner. Let the functionality of the polyol, i.e. the number of OH groups per molecule, be F, and its number average molecular weight be M. Then the number of branch points per 1000 units of molecular weight is given by the formula $$(F-2)1000/M$$

For a mixture of polyols the number of branch points per 1000 units of molecular weight is given by the expression $$\frac{W_1(F_1-2)}{M_1}+\frac{W_2(F_2-2)}{M_2}\ldots\frac{W_n(F_n-2)}{M_n}$$
$$=\sum_{i=1}^{i=n}\frac{W_i(F_i-2)}{M_i}$$

where $F_n$ is the functionality, $M_n$ is the molecule weight and $W_n$ is the weight of the species "$n$" in 1000 units of mixture.

Five samples of such combinations are given in Table I.

TABLE I

| | Weight of polyol per 1,000 grams | | | | |
|---|---|---|---|---|---|
| Diol | Triol mol. weight 700 | Triol mol. weight 400 | Tetrol mol. weight 400 | Hexol mol. weight 600 | No. of branch points per 1,000 units |
| | | 1,000 | | | 2.50 |
| | | | 1,000 | | 5.00 |
| 500 | | | | 500 | 3.33 |
| 200 | | 800 | | | 2.00 |
| 200 | 100 | 400 | 200 | 100 | 2.81 |

A suitable polyester diol for use in admixture with higher polyols is, for example, that obtained from diethylene glycol (1.5 parts by weight) and adipic acid (1 part by weight) and having an OH value of 200.

For manufacture of polyurethane articles in accordance with the invention, the organic polyisocyanate and the organic polyol together in proportions affording a NCO/OH ratio of 0.95/1 to 1.2/1, and the resultant liquid mixture is allowed to react until the gelled state is obtained. At this point the mixture is no longer flowable under the effect of gravity, but is not necessarily a self-sustaining solid. The rate of reaction may be speeded up by use of heat and/or by addition of a catalyst to the reaction mixture. For this purpose there may be used any catalyst for the NCO/OH system, for example basic substances such as tertiary amines, for example triethylamine, dimethylethylamine, N,N - dimethylcyclohexylamine, N,N - dimethylbenzylamine, tetramethyl-1:3-butanediamine, triethylene diamine, N - alkylmorpholines, N - alkylpyrrolidines, N-alkylpiperidines, pyrrolizidine, β - dimethylaminopropionamide and fully N-substituted 4-aminopyridines such as 4-dimethylaminopyridine, and, more especially, organometallic compounds or polyvalent metal salts of organic acids such as dibutyltin dilaurate, dibutyltin diacetate, iron acetylacetonate, manganese acetylacetonate, stannous carboxylates such as stannous octoate and lead carboxylates such as lead acetate and lead octoate. The mixtures may contain other additives, for example, fillers such as carbon black, silica sand, quartz and asbestos, pigments such as iron silicates and chromium pigments, flame retarders such as tris (chloroethyl)phosphate, tris(chloropropyl)phosphate, tris(dichloropropyl)phosphate, tris(dibromopropyl)phosphate and phosphorus containing polyols such as oxypropylated phosphoric acid, antioxidants such as hindered phenols and dehydrating agents such as anhydrous calcium sulphate.

Once the gelled state is reached, the mixture is subjected to a fabrication step. In order to facilitate this, it is preferred that the reaction leading to the gelled state is carried out in a shallow vessel, where the gelled material may easily be removed, or by pouring or spray drying the liquid mixture on to a moving belt having a surface which is non-adherent to polyurethanes, e.g. polytetrafluoroethylene, silicone, or paraffin wax.

The fabrication step may consist of any process wherein the product is shaped or formed, in the presence or absence of a substrate, for example by spreading, extrusion, calandering, compression-moulding, injection moulding, transfer moulding, vacuum forming, blow moulding, stamping or pressing, drawing and twisting, spinning and crimping, and may be applied to the polyurethane mix alone or to a composite structure formed therefrom, e.g. by inclusion of fibres, for example of glass carbon, polyamides or polyesters, fabrics, for example of natural and regenerated cellulose, glass, polyamides and polyesters, foams, for example polyvinyl chloride foamed material, or metal reinforcements, for example wire mesh or steel fibres.

After subjection to the fabrication step, the mixture is preferably heat-cured to attain its hard, plastic state. Such a state can be recognised, e.g. by subjection to a heat distortion temperature test in accordance with ASTM D648–56 wherein, using a pressure of 66 p.s.i. a minimum temperature of 50° C. without failing the test must be achieved. In general products having a heat distortion temperature under this test of 50 to 140° C. are preferred.

The process of the invention can be used for the manufacture of a wide variety of shaped articles. By judicious selection of reactants, a variety of tensile modulus and/or softening temperatures can be obtained. The time of manufacture can be varied from a few minutes upwards, as desired, so that considerable saving in time over manufacture of similar objects entirely by casting becomes possible.

The invention is illustrated but not limited by the following examples in which parts are by weight:

EXAMPLE 1

100 parts of an oxypropylated glycerol of molecular weight 400 is mixed with 105.2 parts of a crude diphenylmethane diisocyanate composition of NCO content 29.6% by stirring for 30 seconds. The mixture is transferred to a shallow aluminum tray and heated at 100° C. After 10 minutes, the mixture is sufficiently solid to be removed from the tray and is transferred to a steel vacuum mould and moulded by applying a vacuum of 15 mm. Hg pressure.

The moulded material is removed from the mould and heated at 100° C. for 45 minutes whereby a solid, tough, shaped article is obtained having a heat distortion temperature of approximately 80° C.

Materials of slightly different characteristics can be obtained using other oxypropylated polyethers in place of that named above, e.g. use of oxypropylated glycerol of MW 300 (75 parts) gives a material of heat distortion temperature of about 110° C.; oxypropylated trimethylolpropane of MW 250 (187.5 parts) gives a material of heat distortion temperature above 130° C.; oxypropylated glycerol or oxypropylated trimethylolpropane of MW 500 (375 parts) give materials of heat distortion temperature about 50° C.

The diphenylmethane diisocyanate composition used in this example is made by phosgenating a crude diaminodiphenylmethane obtained as follows: One mole of formaldehyde is reacted with a mixture of about 4 moles of aniline and about 1 mole of aqueous hydrochloric acid first at about 0° C. and finally at 70–90° C. for about 6 hours. The product is neutralised, the oil is separated and unreacted aniline is distilled off under reduced pressure. As thus prepared, crude diaminodiphenylmethane contains in addition to 2:4'- and 4:4'-diaminodiphenylmethane, about 15% by weight of polyamines which are mainly triamines. This crude diamine, as a solution in o-dichlorbenzene, is added to a solution of at least 1 molar propotion of phosgene in o-dichlorbenzene at about 0° C., the mixture being stirred with exclusion of moisture. The resulting suspension of the carbamyl chloride-hydrochloride reaction product is treated further with phosgene, finally at a temperature of 165–175° C. until reaction is complete as indicated by virtual absence of hydrogen chloride in the effluent gases. A rapid stream of nitrogen is passed into the mixture for several hours at 165–175° C. to remove dissolved phosgene. The reaction mixture is filtered from any undissolved matter and o-dichlorbenzene is substantially completely distilled from the filtrate at a pressure of 20 to 30 mm. until the temperature of the still contents rises 140 to 150° C. The resulting diphenylmethane diisocyanate composition is a brown oil of strength about 87% calculated as diphenylmethane diisocyanate and having an ionisable chlorine content of 0.5%. The polyisocyanate content, as represented by the high boiling residue remaining after distillation of the diphenylmethane diisocyanate at 130–150° C./2–3 mm., amounts to about 30%. In addition to polyisocyanates arising from the polyamines in the crude diamine, this high boiling residue also contains polyisocyanates present as isocyanurate polymer formed in the phosgenation process; these may be detected in the diphenylmethane diisocyanate composition by the presence in its infra red spectrum of absorption bands at 5.85 and 7.05 microns.

EXAMPLE 2

A blend of 98.5 parts of oxypropylated glycerol of molecular weight 400 with 1.5 parts of a solution of triethylene diamine (1 part) in dipropylene glycol (2 parts) previously dehydrated and degassed at 110° C. and 15 mms. Hg pressure are mixed with 105.2 parts of a crude diphenylmethane diisocyanate composition (previously degassed at room temperature) by dispensing through a mixing head agitated at 5000 r.p.m. The reacting urethane mix was pumped into a PVC tube (¼" diameter) and into a glass reinforced polyester mould. When the mould was full, the PVC tube filled with liquid urethane mix was removed from the mixing-head and sealed. After 90 seconds from the start-up, the urethane mix had gelled and after 3 minutes the PVC tube (3 feet long) was wound around a wooden cylinder of 2" diameter. The filled PVC-tube and wooden cylinder were then placed in an oven for 45 minutes at 110° C. On cooling, the PVC-tube was cut away to reveal a solid urethane plastic coil, which was permanently formed and could be used as a helical spring.

EXAMPLE 3

A blend of 100 parts of oxypropylated glycerol of molecular weight 600 with 0.6 part of a solution of triethylene diamine (1 part) in dipropylene glycol (2 parts) previously dehydrated and degassed at 110° C. and 15 mins. Hg pressure were mixed with 72 parts of a crude diphenyl methane diisocyanate composition (previously degassed at room temperature) by dispersing through a mixing-head agitated at 4000 r.p.m. The reacting urethane mix was pumped into a ⅛" wide cavity glass fibre reinforced epoxy-resin mould. After 65 seconds from dispersing, the mixture had gelled and after 7 minutes the casting was removed from the mould in an elastomeric state. The warm elastomer was then wound (in the form of a strip 1½" x 18") around a steel mandrel to form a tube. This tube was then post-cured at 110° C. for 45 minutes and after cooling, a rigid urethane plastic tube was produced.

What we claim is:

1. A process for manufacture of shaped noncellular polyurethane articles which comprises forming an anhydrous reaction mixture of one or more organic polyisocyanates and one or more organic polyols such as will provide a rigid polyurethane on curing, allowing the mixture to cure to a gelled state and subjecting the gelled mixture to a solvent-free fabrication step prior to the mixture reaching a fully cured state.

2. A process as claimed in claim 1 wherein there is used a mixture of di- and higher polyisocyanates resulting from phosgenation of the condensation of formaldehyde, in the presence of acid, with aniline or its homologues or nuclear substituted products.

3. A process as claimed in claim 1 wherein there is used a polypropylene ether polyol or mixture of polypropylene ether polyols having 2 to 5 branch points per 1000 units of molecular weight.

References Cited

UNITED STATES PATENTS

| | | | |
|---|---|---|---|
| 3,464,935 | 9/1969 | Sepkoski et al. | 260—77.5 AP |
| 3,047,356 | 7/1962 | Polanski | 260—77.5 SP |

OTHER REFERENCES

Saunders et al., Polyurethanes Part II, Interscience, New York, 1964, pp. 758–759.

DONALD E. CZAJA, Primary Examiner

M. J. WELSH, Assistant Examiner

U.S. Cl. X.R.

117—132 B; 260—75 NE, 77.5 AP